United States Patent [19]

Jacobson

[11] Patent Number: 5,218,882
[45] Date of Patent: Jun. 15, 1993

[54] CAM HUB FOR SPRING COILING MACHINE

[75] Inventor: John D. Jacobson, Southington, Conn.

[73] Assignee: Newcomb Spring Corporation, Southington, Conn.

[21] Appl. No.: 837,857

[22] Filed: Feb. 18, 1992

[51] Int. Cl.⁵ .................................. F16H 53/05
[52] U.S. Cl. .......................... 74/567; 403/261
[58] Field of Search .............. 403/259, 261, 373; 74/567, 568 R

[56] References Cited

U.S. PATENT DOCUMENTS

| | | | |
|---|---|---|---|
| 1,392,363 | 10/1921 | Shannon | 403/261 |
| 1,773,539 | 8/1930 | Miller | 74/568 |
| 3,075,369 | 1/1963 | Swire | 403/259 X |
| 3,380,766 | 4/1968 | Meibuhr | 403/261 X |
| 4,880,085 | 11/1989 | Taylor | 403/259 X |
| 4,890,945 | 1/1990 | Arter et al. | 403/259 X |
| 4,938,094 | 7/1990 | Cochard | 403/259 X |
| 5,007,302 | 4/1991 | Chen | 74/567 X |
| 5,048,366 | 9/1991 | Spanio | 74/567 |

Primary Examiner—Richard M. Lorence
Assistant Examiner—Khui Q. Ta
Attorney, Agent, or Firm—Chilton, Alix & Van Kirk

[57] ABSTRACT

The hub body has an annular support region, spacer regions on either side of the support region, and threaded regions at the axial ends. Each threaded region has an axially extending slot. First and second cam rings, which each have an inner opening with an effective diameter that is less than the outer diameter of the support region and substantially equal to the outer diameter of the spacer regions, are situated in respective spacer regions in abutting relationship with respective sides of the support ring. Respective first and second spacer rings having inner diameters substantially equal to those of the cams, are also situated in the spacer region in abutting relationship with the cams, so that each cam is sandwiched between one side of the support region and a spacer ring. Each spacer ring has a tab or key member projecting radially inwardly from the spacer ring inner diameter into the slot. First and second locking rings having threaded inner diameters are advanced along the threaded regions and tightened against the respective spacer rings, so as to lock the cams in place.

10 Claims, 1 Drawing Sheet

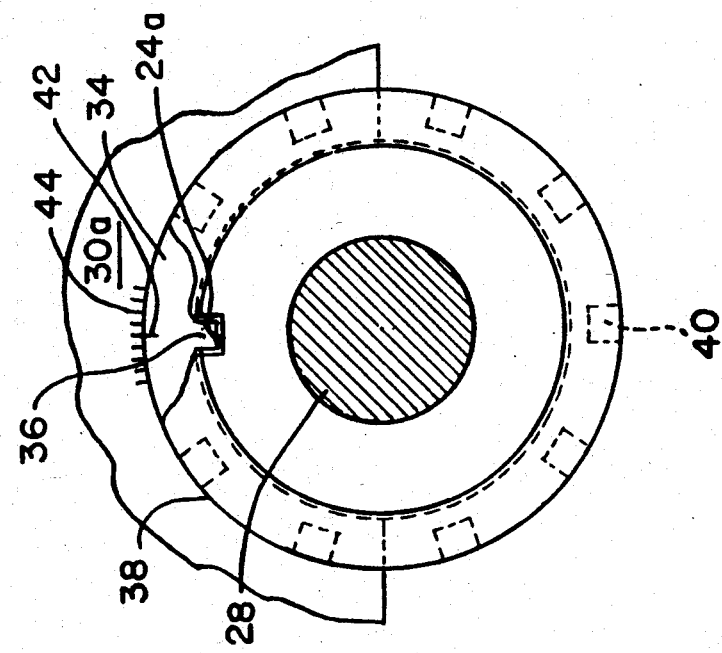
Fig. 3
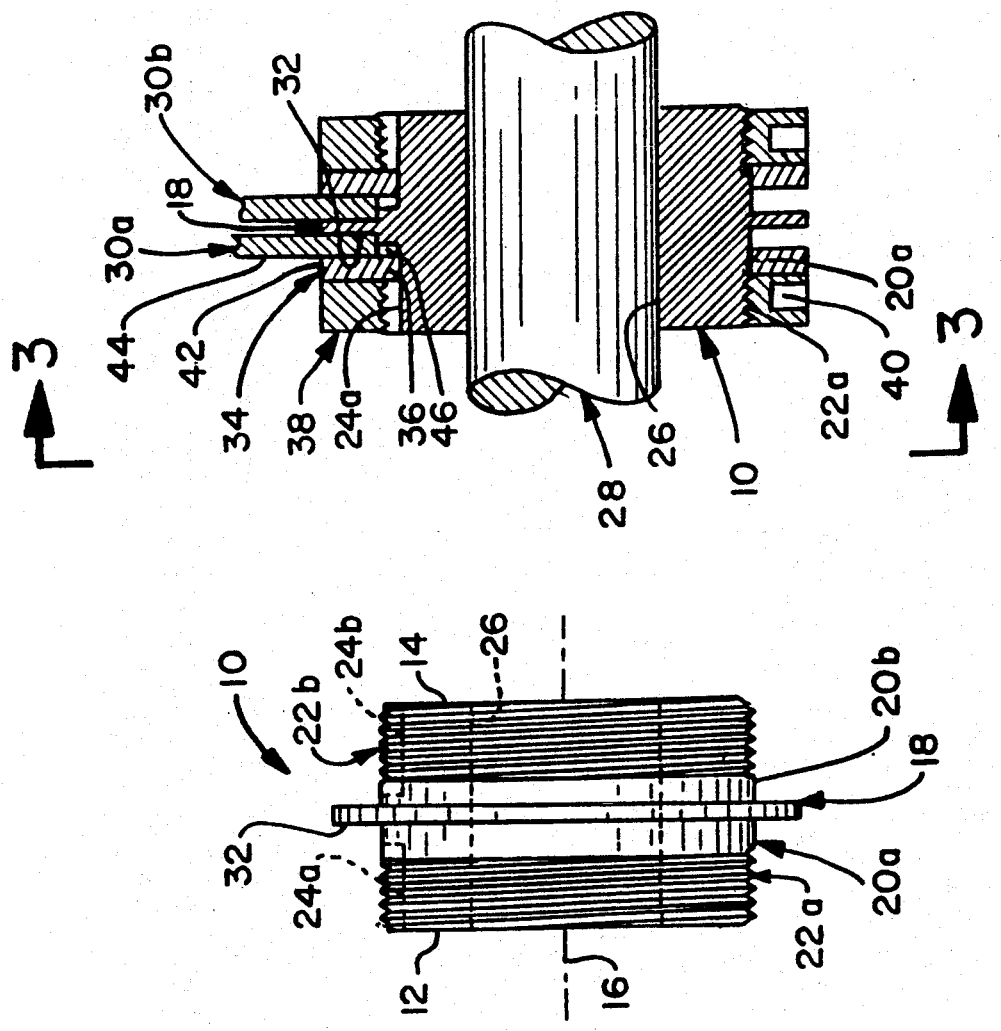
Fig. 2
Fig. 1

CAM HUB FOR SPRING COILING MACHINE

BACKGROUND OF THE INVENTION

The present invention relates to spring coiling machines, and more particularly, to the cam shaft and associated components for defining the movements of the various tools involved in the fabrication of coiled springs.

In conventional spring coiling machines, such as the Torin Model W-11A, available from The Torin Company, Torrington, Connecticut the actions of the various tools are defined by cam surfaces actuated by a primary cam shaft mounted within the housing of the machine. The cam shaft carries a plurality of cam hubs onto which the cams are mounted. Typically, each cam hub is adapted to mount two cams.

Conventional cam hubs are designed so that the two cams are locked onto the hub as the result of a common locking action. In other words, both cams are loosened in the event one cam is to be replaced, and both cams are locked in place together after one has been replaced or adjusted.

This common dependence on the same locking action gives rise to a significant nuisance during machine setup and adjustment. It should be appreciated that proper operation of the intricate movements of the tools in a coiling spring machine, requires not only that the cams be cut to define a precise cam surface, or race, but also that the cam itself be locked on the shaft in a precise angular orientation relative to the shaft. With a conventional cam hub, considerable care and effort is required to maintain the proper angular orientation of the first cam while attempting to properly orient the second cam, and then locking the two cams substantially simultaneously without jostling the cams out of the required orientation.

SUMMARY OF THE INVENTION

It is, accordingly, an object of the present invention to provide a hub for a spring coiling machine, on which two cams can be independently mounted.

It is a further object of the invention to provide a hub for a spring coiling machine, which facilitates the precise orientation of two during initial setup and one or cams, when a previous setup is to be duplicated.

In the most general embodiment of the invention, the hub comprises a rigid, central support region or divider ring having a first outer diameter, a spacer region adjacent the support ring defining a second outer diameter, and a threaded region extending axially outwardly from each spacer region to an axial end of the hub. The spacer region has a substantially smooth, cylindrical, second diameter less than that of the first diameter of the support ring. The threaded region has a third outer diameter substantially equal to the second outer diameter. A slot extends axially from the end of the hub, through the threaded region, and preferably at least partially through the spacer region.

In the preferred, assembled configuration on the cam shaft, first and second cam rings, which each have an inner opening with an effective diameter that is less than the outer diameter of the support region and substantially equal to the outer diameter of the spacer regions, are situated in respective spacer regions in abutting relationship with respective sides of the support ring. Respective first and second spacer rings having inner diameters substantially equal to those of the cams, are also situated in the spacer region in abutting relationship with the cams, so that each cam is sandwiched between one side of the support region and a spacer ring. Each spacer ring has a tab or key member projecting radially inwardly from the spacer ring inner diameter into the slot. First and second locking rings having threaded inner diameters are advanced along the threaded regions and tightened against the respective spacer rings, so as to lock the cams in place.

In this configuration, the key or tab on each spacer ring prevents the spacer ring from rotating about the spacer region as the locking ring is rotationally advanced along the threads. The rotational component of the locking ring force is not imposed on the cam. Thus, each cam is locked in place by only an axially directed force transmitted by the spacer ring. Locking the cams in place according to the invention, avoids the common problem in the conventional techniques, by which the cam is forced out of its desired rotational orientation on the shaft, as the result of rotational forces acting on the cam during advancement of the locking ring.

BRIEF DESCRIPTION OF THE DRAWINGS

These and other objects and advantages of the invention will become evident to persons ordinarily skilled in this field, from the following description of the preferred embodiment made with reference to the accompanying drawings, in which:

FIG. 1 is a side view of the inventive hub prior to mounting on the cam shaft;

FIG. 2 is a longitudinal section view of the hub mounted on the cam shaft, with the cams locked on the hub in accordance with the invention; and FIG. 3 is an end view of the hub and locked cams, along line 3—3 of FIG. 2.

FIG. 1 shows the preferred form of the hub body 10 for a spring coiling machine of the type mentioned above. The hub 10 is substantially tubular, having first and second ends 12,14 and a central axis 16 which, upon installation, will be coaxial with the axis of the cam shaft 28 (see FIGS. 2 and 3). The hub 10 has a divider or support region or ring 18 rigidly projecting annularly around the mid plane between the ends 12,14, and defining a first outer diameter. On either axial side of the divider region, first and second spacer regions 20a,20b extend axially towards the ends 12,14. As used in this specification, the suffixes "a" and "b" indicate substantially identical structure disposed symmetrically on respective first and second axial sides of the hub, taken with reference to the centrally situated divider region 18. The use of the numeric identifier without the suffix, should be understood as referring to either or both of the symmetrically disposed members.

The spacer regions 20 have a smooth, second outer diameter which is less than the first outer diameter established by the divider region 18. Threaded regions 22a,22b extend axially outwardly from the respective spacer region 20a,20b to the respective ends 12,14 of the hub. The threaded region 22 has a third outer diameter, preferably substantially equal to the second outer diameter defined by the spacer region 20. A slot, channel, or keyway 24a,24b extends in the axial direction through each of the threaded regions 22a,22b, and preferably extends at least partially into the respective spacer regions 20a,20b.

The hub body 10, being substantially tubular, includes an inner wall defining a substantially cylindrical inner diameter 26 extending from the first to the second ends 12,14, for receiving the shaft. The mounting of the hub body 10 to the shaft is accomplished in a conventional manner, such as with a key, keyway, and set screw. Typically, the hub body is locked to the cam shaft in a relatively permanent position The cams are changed in accordance with the invention, while the hub remains on the shaft.

FIGS. 2 and 3 illustrate the combination of the hub body 10 and associated cams and locking components, as mounted on the cam shaft, ready for machine operation. This configuration will be described in a manner that illustrates the sequence of steps by which the cams are locked in place. It should be appreciated that in FIG. 2, the section line above the cam shaft 28 passes through the channel or keyway 24, which in this embodiment is provided at only one circumferential position on the hub, although more than one such keyway can optionally be utilized. Furthermore, the description will refer only to the locking of the first cam 30a, although it should be appreciated that the procedure is identical, and completely independently effectuated, for the second cam 30b.

Cam 30a, which has a semi-circular inner surface with an effective diameter that is substantially the same as the outer diameter of the spacer region 20a, is initially passed transversely to the axis so as to fit on the spacer region 20a and against a first side surface 32 on the support ring 18. As a second step, a substantially annular spacer ring 34 having an inner diameter which permits it to pass over the threaded region 22a and spacer region 20a, is oriented on the hub such that the tab or key 36 thereof is in alignment with the channel or keyway 24a, as is best shown in FIG. 3. The spacer ring 34 is then moved along the hub into contact with the cam 30a. A substantially annular locking ring 38 having internal threading, is then advanced along the threaded region 22a into contact with the spacer ring 34. The locking ring 38 is hand-tightened to sandwich the cam 30a between the spacer ring 34a and the support surface 32 on the divider ring 18.

With reference now to FIG. 3, the operator adjusts the rotational orientation of the cam 30a, until one of a predetermined reference mark 44 along the cam ring near its inner diameter, registers with a reference mark 42 on the outer diameter of the spacer ring 34. As shown in FIG. 2, the orientation marks 44 on the cam are located at a diameter that is slightly greater than the outer diameter of the spacer 34, so that the mark 44 will be visible to the operator. The reference mark 42 can extend axially at the outer diameter of the spacer ring 34. It should be appreciated that because of the unique rotational orientation or angular orientation of the spacer ring 34 relative to the hub body 10 provided by the unique fit of the tab 36 in the slot 24a, the reference mark 42 will always appear in the same rotational orientation relative to the hub body 10. Since the hub 10 is mounted on the shaft 28 in a conventional manner, which also includes a key and keyway or other unique engagement, the reference mark 42 will also be in a unique, repeatable orientation relative to the shaft 28. By first specifying, and then repeating, the match of a particular mark 44 on cam 30a, in registry with the reference mark 42 on the spacer ring, the operator can very accurately and repeatably set the cam in the proper rotational orientation relative to the shaft.

Moreover, with the present invention, after the registration of mark 42,44 is made while the cam has been hand-tightened, further advancement of the locking ring 38 using a conventional tool engaging locking notches 40, does not cause rotation of either the spacer ring 34 or the cam 30a. Despite the rotational component of force arising from the screwing action of the locking ring 38 against the spacer ring 34, the key 36 interacting against the wall of the keyway 24a prevents rotational movement of the spacer ring 34, so that only an axial force is transmitted to the cam 30a. Such axial force sandwiches the cam 30a between the spacer ring 34 and support surface 32, without disrupting the registry of the selected mark 44 with the referenced mark 42. The spacer ring 20a and the locking ring 38 are simply loosened to replace or otherwise make changes in the cam, then retightened, in the manner described above. Loosening or retightening of the lock ring 38 should require only about one-quarter to one-half return.

The invention has been described in the preferred embodiment, whereby two cams 30a,30b are mounted on hub body 10. It should be appreciated that, for a particular coiling machine or desired coiling operation, only one cam may be required on a given hub. Even in this implementation, the present invention provides a significant advantage relative to known techniques, in the capability to accurately orient the cam during assembly, and maintain the accurate orientation during full tightening of the locking ring 38. Thus, the invention should be understood as including a hub adapted to receive only a single cam, if installed according to the manner described and claimed herein.

It should also be appreciated that the relationship of the inner and outer diameters of the various components described herein, such as the hub body profiles defining the divider region 18, the spacer region 20, and the threaded region 22, as well as the cams 30, spacer rings 34 and locking rings 38, are not, except for a few considerations, critical. The critical dimensional relationships include the effective inner diameter of the cams 30 to permit insertion and removal of the cams on the spacer regions, preferably in a direction perpendicular to the hub or shaft axis. The divider ring 18 must provide an annular surface 32 sufficient to lock one side of the cam. Similarly, the inner diameter of the spacer ring 34 must be sufficient to pass axially over the spacer region 20 and abut the cam, with sufficient overlap to achieve a locking action. The spacer ring need not be a complete ring, but should fit around the spacer region along an arc that is greater than the arc of the opening on the cam, e.g., at least about 180°.

As used herein, "effective diameter" means the radius of curvature of the inner portion of the cam or spacer ring that fits onto or closely follows the circumferential outer surface of the spacer region (or threaded region) by at least 90°, and preferably 180° for the cam and at least 270° for the space ring. Similarly, the term "ring" as used herein, includes structure that surrounds the shaft by at least 180°. Preferably, as shown in FIG. 2, the outer diameter of spacer 34 is approximately equal to the outer diameter of the divider ring 18, but this is not critical. The axial extent of the channel 24 can vary considerably, as long as the spacer ring 34 does not abut the inner terminus 46 of the channel when a cam is situated in the spacer region 20. In the locked configuration, the spacer may circumscribe one or both of the threaded region 22 or spacer region 20.

I claim:

1. A cam hub coaxially mounted on a cam shaft of spring coiling machine, comprising:

a generally tubular body member mounted to the cam shaft for coaxial rotation therewith, the body member having, first and second axial ends, outer profile means defining distinct external regions of the body member, including a divider region annularly projecting from the body member substantially equidistantly from the ends, and having a first outer diameter and first and second side surfaces facing the first and second ends, respectively, spacer regions extending axially outwardly toward each end from the divider region, the spacer regions having a substantially smooth, cylindrical, second outer diameter less than said first outer diameter, threaded regions extending axially outwardly from each spacer region to each end, and means defining a slot extending axially through each threaded region;

first and second cam rings each fit on one of the spacer regions such that each cam ring is slidable against one of said divider region side surfaces;

first and second spacer rings carried on the body member so as to be movable axially against one of the cams, and including a key member projecting radially inwardly toward the shaft and sized to pass axially through said slot as the spacer ring moves toward and against the cam ring; and first and second locking rings having a threaded inner diameter for engaging and advancing along the outer diameter of the threaded regions, thereby urging the spacer rings without rotation, toward the cam rings and locking the cam rings between the spacer rings and the divider region side surfaces.

2. The hub of claim 1, wherein the slot extends axially from the threaded region into the spacer region.

3. The hub of claim 1, wherein the spacer ring includes a reference means for identifying a unique angular orientation relative to the hub body.

4. The hub of claim 3, wherein the cam ring includes at least one mark visible in conjunction with the reference means on the spacer ring, for establishing a unique angular relationship between the cam ring and the spacer ring.

5. A hub for a cam shaft of a spring coiling machine, comprising:

a support region having a first outer diameter;

a substantially smooth, cylindrical spacer region adjacent the support region and defining a second outer diameter less than said first outer diameter;

a threaded region extending axially outwardly from the spacer region, the threaded region having a third outer diameter; and means defining a slot extending axially through the threaded region the second diameter substantially equal to the third diameter.

6. The hub of claim 5, wherein the slot extends axially from the threaded region into the spacer region.

7. A hub for a cam shaft of a spring coiling machine comprising:

a support region having a first outer diameter;

a substantially smooth, cylindrical spacer region adjacent the support region and defining a second outer diameter less than said first outer diameter;

a threaded region extending axially outwardly from the spacer region, the threaded region having a third outer diameter; and means defining a slot extending axially through the threaded region further including a spacer ring having an inner effective diameter at least equal to the outer diameter of the threaded region and including a key member projecting radially inwardly from the inner diameter and sized to pass axially through the slot.

8. The hub of claim 7, wherein the spacer ring includes reference means for defining a unique angular orientation relative to the hub, when the spacer ring key is situated in said slot.

9. The hub of claim 7 further including a cam ring having an inner opening with an effective diameter that fits on and is slidable along the spacer region.

10. The hub of claim 9 further including a locking ring having a threaded inner diameter for engaging and advancing along the outer diameter of the threaded region, thereby urging the spacer ring without rotation, toward the cam ring and locking the cam ring between the spacer ring and the support region.

* * * * *